US012585686B2

(12) United States Patent
Zhao et al.

(10) Patent No.: US 12,585,686 B2
(45) Date of Patent: Mar. 24, 2026

(54) EVENT DETECTION AND CLASSIFICATION METHOD, APPARATUS, AND DEVICE

(71) Applicant: Alipay (Hangzhou) Information Technology Co., Ltd., Hangzhou (CN)

(72) Inventors: Wenbiao Zhao, Hangzhou (CN);
Haotian Wang, Hangzhou (CN);
Xiaofeng Wu, Hangzhou (CN);
Weiqiang Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 253 days.

(21) Appl. No.: 18/457,107

(22) Filed: Aug. 28, 2023

(65) Prior Publication Data

US 2024/0070182 A1 Feb. 29, 2024

(30) Foreign Application Priority Data

Aug. 29, 2022 (CN) .......................... 202211041057.7

(51) Int. Cl.
*G06F 16/35* (2019.01)
*G06F 40/284* (2020.01)
*G06Q 50/26* (2012.01)

(52) U.S. Cl.
CPC ............ *G06F 16/35* (2019.01); *G06F 40/284* (2020.01); *G06Q 50/265* (2013.01)

(58) Field of Classification Search
CPC ........ G06F 21/31; G06F 21/64; G06F 16/285; G06F 16/2455; G06F 16/35; G06F 40/284; G06F 40/30
See application file for complete search history.

(56) References Cited

U.S. PATENT DOCUMENTS 10,755,281 B1 * 8/2020 Yip .................... G06Q 20/4016
11,989,740 B2 * 5/2024 Kramme ............ G06Q 20/3224
(Continued)

FOREIGN PATENT DOCUMENTS

CN 108280766 A 7/2018
CN 111553701 A 8/2020
(Continued)

OTHER PUBLICATIONS

An, Jingyi et al., "NEUD-TRI: Network Embedding Based on Upstream and Downstream for Transaction Risk Identification", 2020 IEEE 44th Annual Computer Software and Applications Conference, Madrid, Spain, 2020, pp. 277-286.
(Continued)

*Primary Examiner* — Olujimi A Adesanya
(74) *Attorney, Agent, or Firm* — Seed IP Law Group LLP

(57) ABSTRACT

Implementations of the present specification disclose an event risk detection method, apparatus, and device. The method includes: obtaining event description information provided by a plurality of different event initiators when the plurality of different event initiators each initiate a target event to a same event target party in a same event service; then converting, into a token sequence, a plurality of character sequences of the event description information provided by the plurality of different event initiators, the token sequence including a plurality of sub-token sequences each corresponding to a character sequence of event description information provided by an event initiator; setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and determining, based on a corre- (Continued)

sponding sub-token sequence placed at each set of the first number of token positions, token information of an event initiator corresponding to each set of the first number of token positions, and a text classification model, whether the target event is at risk.

20 Claims, 6 Drawing Sheets

(56) References Cited

U.S. PATENT DOCUMENTS

| | | | | |
|---|---|---|---|---|
| 2013/0197998 | A1* | 8/2013 | Buhrmann | H04M 1/27 726/3 |
| 2015/0026027 | A1* | 1/2015 | Priess | G06Q 10/04 705/35 |
| 2018/0115899 | A1* | 4/2018 | Kedem | G06F 21/31 |
| 2020/0219080 | A1 | 7/2020 | Graham et al. | |
| 2021/0233087 | A1* | 7/2021 | Edwards | G06Q 20/40145 |
| 2022/0180368 | A1* | 6/2022 | Immaneni | G06Q 20/4014 |
| 2022/0327528 | A1* | 10/2022 | Brudnicki | G06Q 20/385 |

FOREIGN PATENT DOCUMENTS

| | | | | | |
|---|---|---|---|---|---|
| CN | 112200382 | A | | 1/2021 | |
| CN | 112988991 | A | * | 6/2021 | G06F 16/35 |
| CN | 113011875 | A | | 6/2021 | |
| CN | 113191777 | A | | 7/2021 | |
| CN | 113450215 | A | | 9/2021 | |
| CN | 113807073 | A | | 12/2021 | |
| CN | 114281984 | A | | 4/2022 | |
| CN | 114372884 | A | | 4/2022 | |
| CN | 114549001 | A | | 5/2022 | |
| CN | 115600155 | A | | 1/2023 | |

OTHER PUBLICATIONS

Lu, Yanqun et al., "Risk Identification and Discovery Based on Transaction Message Fingerprint Relationship of Commercial Bank", Application Research of Computers, vol. 34, No. 3, Mar. 2017, 5 pages.

* cited by examiner

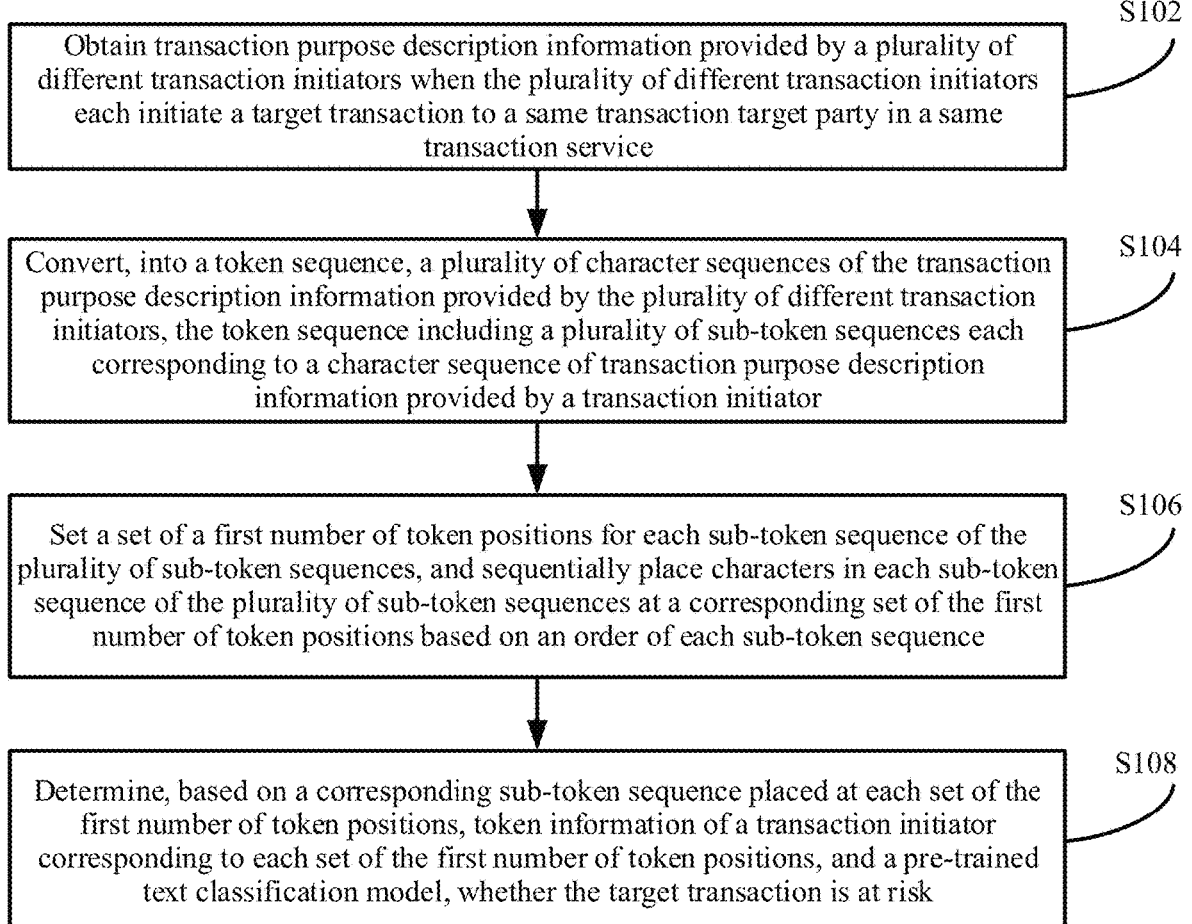

S102

Obtain transaction purpose description information provided by a plurality of different transaction initiators when the plurality of different transaction initiators each initiate a target transaction to a same transaction target party in a same transaction service

S104

Convert, into a token sequence, a plurality of character sequences of the transaction purpose description information provided by the plurality of different transaction initiators, the token sequence including a plurality of sub-token sequences each corresponding to a character sequence of transaction purpose description information provided by a transaction initiator

S106

Set a set of a first number of token positions for each sub-token sequence of the plurality of sub-token sequences, and sequentially place characters in each sub-token sequence of the plurality of sub-token sequences at a corresponding set of the first number of token positions based on an order of each sub-token sequence

S108

Determine, based on a corresponding sub-token sequence placed at each set of the first number of token positions, token information of a transaction initiator corresponding to each set of the first number of token positions, and a pre-trained text classification model, whether the target transaction is at risk

FIG. 1

Result

MLP

BERT model

Token sequence    [CLS] wo gei wo peng you huan qian [SEP] mai yi fu [SEP] jiu peng you you dian shi Token position     0     1  2  3    4    5      6     7    8   9  10 11           ...                    18

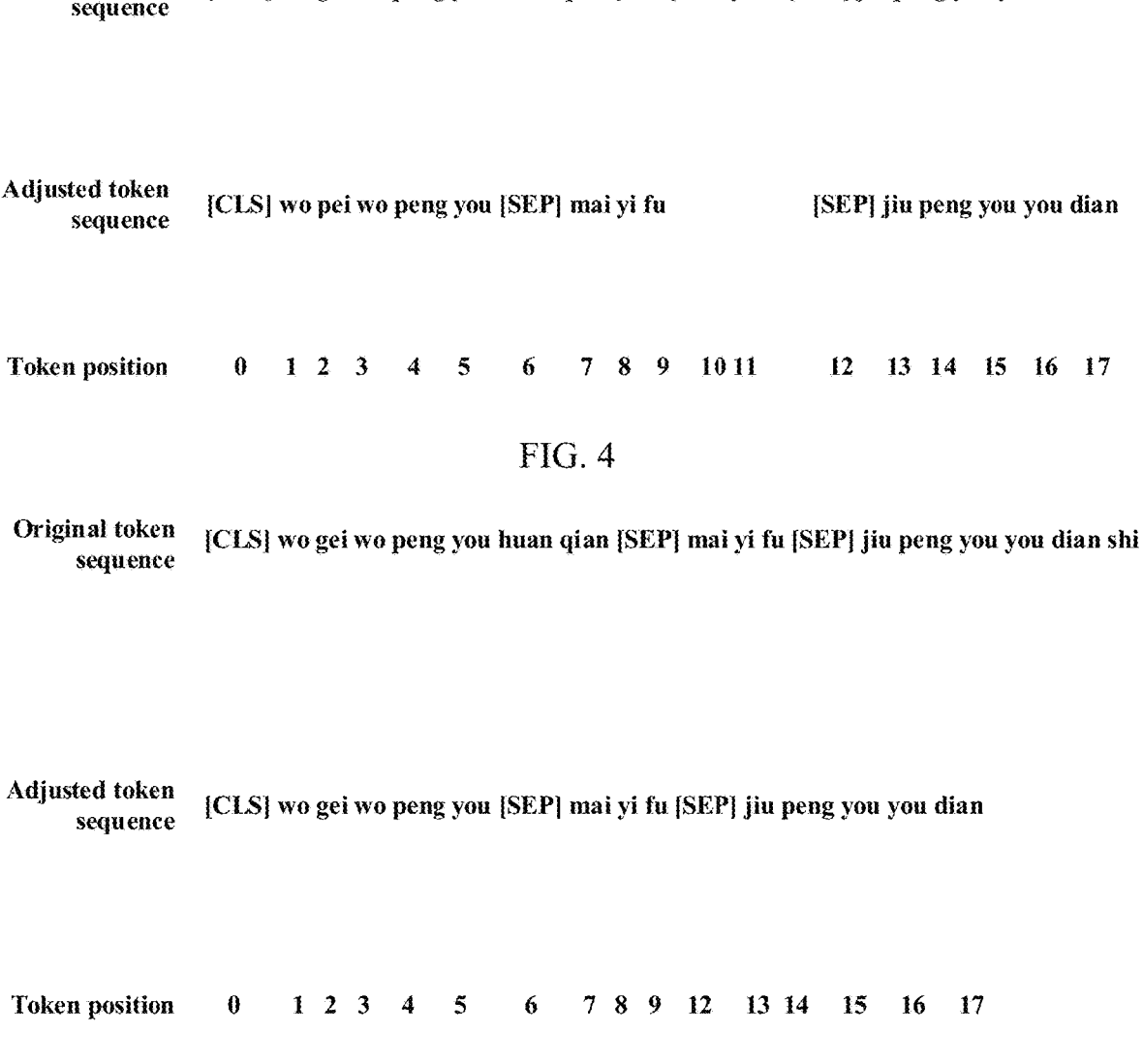

Original token sequence    [CLS] wo gei wo peng you huan qian [SEP] mai yi fu [SEP] jiu peng you you dian shi Adjusted token sequence    [CLS] wo pei wo peng you [SEP] mai yi fu        [SEP] jiu peng you you dian Token position    0   1  2  3   4   5    6    7  8  9  10 11    12   13  14  15  16  17

FIG. 4

Original token sequence    [CLS] wo gei wo peng you huan qian [SEP] mai yi fu [SEP] jiu peng you you dian shi Adjusted token sequence    [CLS] wo gei wo peng you [SEP] mai yi fu [SEP] jiu peng you you dian Token position    0    1  2  3   4   5    6    7  8  9  12   13 14   15   16   17

FIG. 5

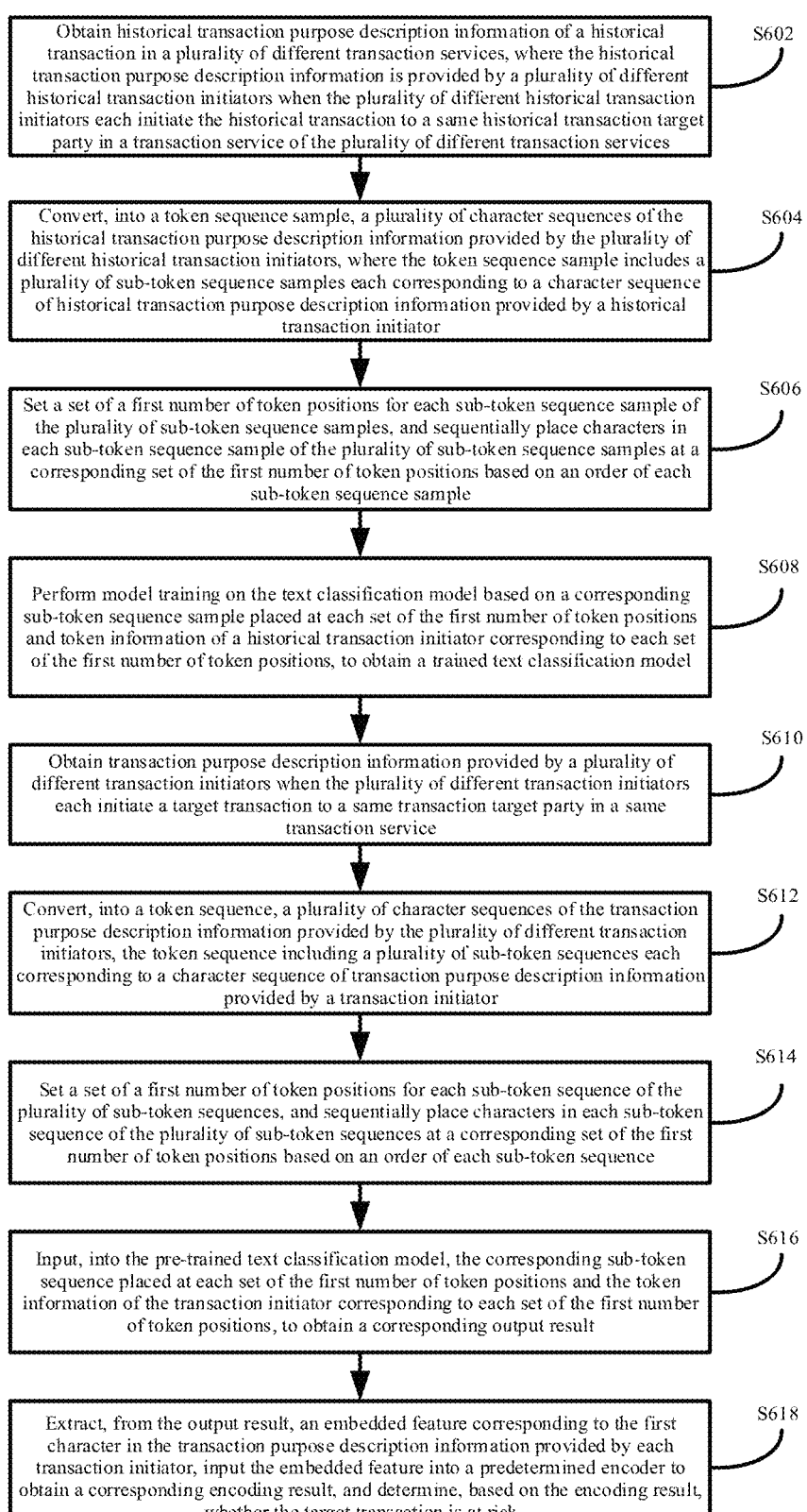

Obtain historical transaction purpose description information of a historical transaction in a plurality of different transaction services, where the historical transaction purpose description information is provided by a plurality of different historical transaction initiators when the plurality of different historical transaction initiators each initiate the historical transaction to a same historical transaction target party in a transaction service of the plurality of different transaction services
S602

Convert, into a token sequence sample, a plurality of character sequences of the historical transaction purpose description information provided by the plurality of different historical transaction initiators, where the token sequence sample includes a plurality of sub-token sequence samples each corresponding to a character sequence of historical transaction purpose description information provided by a historical transaction initiator
S604

Set a set of a first number of token positions for each sub-token sequence sample of the plurality of sub-token sequence samples, and sequentially place characters in each sub-token sequence sample of the plurality of sub-token sequence samples at a corresponding set of the first number of token positions based on an order of each sub-token sequence sample
S606

Perform model training on the text classification model based on a corresponding sub-token sequence sample placed at each set of the first number of token positions and token information of a historical transaction initiator corresponding to each set of the first number of token positions, to obtain a trained text classification model
S608

Obtain transaction purpose description information provided by a plurality of different transaction initiators when the plurality of different transaction initiators each initiate a target transaction to a same transaction target party in a same transaction service
S610

Convert, into a token sequence, a plurality of character sequences of the transaction purpose description information provided by the plurality of different transaction initiators, the token sequence including a plurality of sub-token sequences each corresponding to a character sequence of transaction purpose description information provided by a transaction initiator
S612

Set a set of a first number of token positions for each sub-token sequence of the plurality of sub-token sequences, and sequentially place characters in each sub-token sequence of the plurality of sub-token sequences at a corresponding set of the first number of token positions based on an order of each sub-token sequence
S614

Input, into the pre-trained text classification model, the corresponding sub-token sequence placed at each set of the first number of token positions and the token information of the transaction initiator corresponding to each set of the first number of token positions, to obtain a corresponding output result
S616

Extract, from the output result, an embedded feature corresponding to the first character in the transaction purpose description information provided by each transaction initiator, input the embedded feature into a predetermined encoder to obtain a corresponding encoding result, and determine, based on the encoding result, whether the target transaction is at risk
S618

FIG. 6

Result

| | |
|---|---|
| | Encoder (Transformer Block) |
| | BERT model |

Token sequence   [CLS] wo gei wo peng you [SEP] mai yi fu [SEP] jiu peng you you dian Token position    0    1  2  3    4    5    6    7  8  9  12   13  14  15  16  17

Token information of a
transaction initiator    A    A  A  A    A    A    B    B  B  B  C    C  C  C  C  C

EVENT DETECTION AND CLASSIFICATION METHOD, APPARATUS, AND DEVICE

TECHNICAL FIELD

The present specification relates to the field of computer technologies, and in particular, to risk event detection and classification detection method, apparatus, and device.

BACKGROUND

In human-computer interaction of a risk event control scenario, a user may provide false information to obtain undue benefits. An account of an event target party in the risk control scenario is fixed, and a number of event initiators is large.

Generally, a plurality of pieces of evidence can be obtained to determine whether certain information is true or false or whether a certain event is a risk event.

SUMMARY

The present specification provides a risk event detection and classification mechanism, which quickly and accurately detects whether event description information provided by a plurality of event initiators for a specified event is contradictory to each other, so as to determine whether an event initiator in the plurality of event initiators provides false information, and further determine whether the event is at risk. The event detection and classification mechanism includes a natural language processing technique that processes event descriptions provided by event initiators of a target event.

The solution determines whether event description information provided by a plurality of event initiators for a specified event is contradictory to each other, so as to determine whether a certain event initiator in the plurality of event initiators provides false information, and further determine whether the event is a risk event.

The present specification may be implemented using the following example implementations:

An implementation of the present specification provides an event risk detection method. The method includes: obtaining event description information provided by a plurality of different event initiators when the plurality of different event initiators each initiate a target event to a same event target party in a same event service; converting, into a token sequence, a plurality of character sequences of the event description information provided by the plurality of different event initiators, the token sequence including a plurality of sub-token sequences each corresponding to a character sequence of event description information provided by an event initiator; setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and determining, based on a corresponding sub-token sequence placed at each set of the first number of token positions, token information of an event initiator corresponding to each set of the first number of token positions, and a pre-trained text classification model, whether the target event is at risk.

An implementation of the present specification provides an event risk detection apparatus. The apparatus includes: a text information acquisition module, configured to obtain event description information provided by a plurality of different event initiators when the plurality of different event initiators each initiate a target event to a same event target party in a same event service; a conversion module, configured to convert, into a token sequence, a plurality of character sequences of the event description information provided by the plurality of different event initiators, the token sequence including a plurality of sub-token sequences each corresponding to a character sequence of event description information provided by an event initiator; a processing module, configured to set a set of a first number of token positions for each sub-token sequence of the plurality of sub-token sequences, and sequentially place characters in each sub-token sequence of the plurality of sub-token sequences at a corresponding set of the first number of token positions based on an order of each sub-token sequence; and a risk determining module, configured to determine, based on a corresponding sub-token sequence placed at each set of the first number of token positions, token information of an event initiator corresponding to each set of the first number of token positions, and a pre-trained text classification model, whether the target event is at risk.

An implementation of the present specification provides an event risk detection device. The event risk detection device includes a processor, and a memory configured to store computer-executable instructions. The executable instructions are execute to cause processor to perform the following operations: obtaining event description information provided by a plurality of different event initiators when the plurality of different event initiators each initiate a target event to a same event target party in a same event service; converting, into a token sequence, a plurality of character sequences of the event description information provided by the plurality of different event initiators, the token sequence including a plurality of sub-token sequences each corresponding to a character sequence of event description information provided by an event initiator; setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and determining, based on a corresponding sub-token sequence placed at each set of the first number of token positions, token information of an event initiator corresponding to each set of the first number of token positions, and a pre-trained text classification model, whether the target event is at risk.

An implementation of the present specification further provides a storage medium. The storage medium is configured to store computer-executable instructions. The executable instructions are executed by a processor to implement the following process: obtaining event description information provided by a plurality of different event initiators when the plurality of different event initiators each initiate a target event to a same event target party in a same event service; converting, into a token sequence, a plurality of character sequences of the event description information provided by the plurality of different event initiators, the token sequence including a plurality of sub-token sequences each corresponding to a character sequence of event description information provided by an event initiator; setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and determining, based on a corresponding sub-token sequence placed at each set of the first number of token positions, token information of an event initiator corresponding to each set of the first number of token positions, and a pre-trained text classification model, whether the target event is at risk.

BRIEF DESCRIPTION OF DRAWINGS

To describe the technical solutions in the implementations of the present specification or in the existing technologies more clearly, the following is a brief introduction of the accompanying drawings for illustrating such technical solutions. Clearly, the accompanying drawings described below are merely some implementations of the present specification, and a person of ordinary skill in the art can derive other accompanying drawings from such accompanying drawings without making innovative efforts.

FIG. 1 illustrates an implementation of an event risk detection method according to the present specification;

FIG. 4 is a schematic diagram illustrating a token sequence and setting of a token position according to the present specification;

FIG. 5 is another schematic diagram illustrating a token sequence and setting of a token position according to the present specification;

FIG. 6 illustrates an implementation of another event risk detection method according to the present specification;

DESCRIPTION OF IMPLEMENTATIONS

Figures 2, 3:
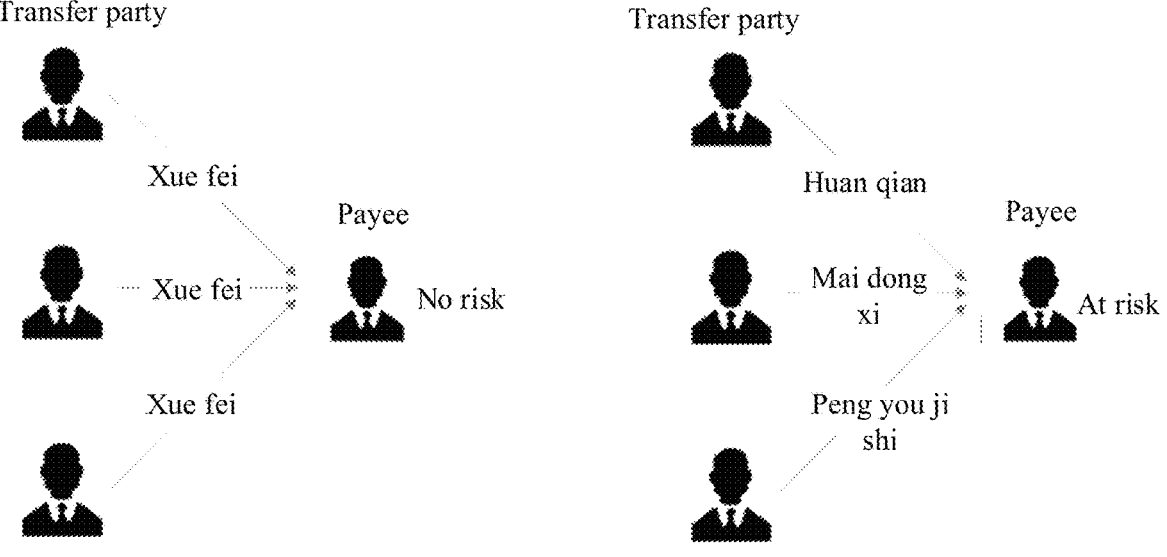
FIG. 2 is a schematic diagram illustrating an event scenario.
FIG. 3 is a schematic diagram illustrating an event risk detection process.

Implementations of the present specification provide an event risk detection method, apparatus, and device.

To make a person skilled in the art better understand the technical solutions in the present specification, the following clearly and completely describes the technical solutions in the implementations of the present specification with reference to the accompanying drawings in the implementations of the present specification. Clearly, the described implementations are merely some not all of the implementations of the present specification. All other implementations obtained by a person of ordinary skill in the art based on the implementations of the present specification without making innovative efforts shall fall within the protection scope of the present specification.

As shown in FIG. 1, the implementation of the present specification provides an event risk detection method. The method can be performed by a terminal device or a server. The terminal device can be a terminal device such as a mobile phone or a tablet computer, or can be a computer device such as a notebook computer or a desktop computer, or can be an Internet of Things (IoT) device (for example, a smart watch or an in-vehicle device). The server can be an independent server, or can be a server cluster including a plurality of servers, or the like. The server can be a background server of a financial service, an online shopping service, or the like, or can be a background server of a certain application. In the implementation, the server is used as an example for detailed description. For an execution process of the terminal device, references can be made to the following related content. Details are omitted herein for simplicity. The method can for example include the following steps:

In step S102, it is obtained event description information provided by a plurality of different event initiators to a same event target party in a same event service when the plurality of different event initiators initiate a target event. In some implementations, an event service refers to a service provided by a service provider, e.g., an internet-based online service provider, to facilitate the performance of an event initiated by the event initiators. For example, an on-line shopping platform may facilitate a logistic process of an event of transferring a product. Multiple event initiators, e.g., a seller of the product, one or more transportation carriers, a warehouse or other storage facilities, may initiate the logistic process as an event, all to a same buyer who is supposed to receive the product ultimately shipped to the buyer. An on-line platform may provide service for the logistic event initiated by the multiple event initiators and may determine whether the initiated logistic event is at risk by processing the event description information provided by the multiple event initiators.

The event service can be any service used to perform an event. For example, the event service can be online shopping, a physical transaction, a marketing event, a transfer service, a payment service, or the like. The event can be any event based on an actual situation. This is not limited in the implementation of the present specification. The event initiator can be a party that initiates a corresponding event when the above event service is executed. For example, if the event service is a transfer service, the event initiator can be a party that performs transfer. This can be set correspondingly based on different event services. The event target party can be a target party to which a corresponding event is directed when the above event service is executed. For example, if the event service is a transfer service, the event target party can be a transferee or a party that receives a resource or goods transferred by the event initiator. The event description information can be information describing a purpose or a content of a certain event. The purpose or content of the event can be determined based on an attribute of the event, for example, "dedicated to XX project", or can be determined based on a function of the event, for example, "huan qian" or "mai dong xi" in Chinese, or can be determined based on other information, for example, "xue fei", "ke cheng", and "peng you ji shi" in Chinese. The specification is not limited by any specific purpose or content of an event.

In implementations, in human-computer interaction of a risk control scenario, a user may provide false information to obtain undue benefits. An account of an event target party in the risk control scenario is fixed, and a number of event initiators is large. Therefore, it is determined whether event description information of a plurality of event initiators for a specified event is contradictory to each other, so as to determine whether a certain event initiator in the plurality of event initiators provides false information, and further determine whether the event is a risk. Generally, a plurality of pieces of evidence can be obtained to determine whether certain information is true or false or whether a certain object is at risk. However, in the above scenario, all the event initiators provide the event description information for the same event, and different event initiators are different in many aspect, e.g., credibility of corresponding evidence provided by some initiator is higher than that provided by other event initiators. Implementations of the present specification provides an implementable natural language processing technical solution that can help quickly and accurately detect whether event description information provided by a plurality of transaction initiators for an event is contradictory to each other, so as to determine whether an event initiator in the plurality of event initiators provides false information, and further determine whether the event is at risk.

FIG. 2 shows an example scenario of the implementation, e.g., a scenario of a transfer service. The event initiator is a resource transfer party, and the event target party is a resource transferee party, e.g., a payee of a money transfer event or a buyer of a goods transfer event. As shown in the left figure in FIG. 2, when event description information ("xue fei", "xue fei", and "ke cheng") provided by three transfer parties for a current event is closely related to or consistent with each other, it can be considered that the transferee is relatively credible and the current transfer event is not at risk. As shown in the right figure in FIG. 2, when the event description information ("huan qian", "mai dong xi", "peng you ji shi") provided by the three transfer parties for the current transfer event is quite different from each other, it indicates that a transfer party may provide false event description information. In this case, it can be considered that the transferee is possibly at risk and the current transfer event is at risk or risky.

For a common text classification model, e.g., using natural language processing, if the event description information provided by the plurality of different event initiators is directly spliced and then input to the above text classification model for text classification, the text classification model cannot well distinguish which event initiator the different text content contained in the information obtained through splicing belongs to, causing poor classification effect. For example, the text classification model is constructed based on a Bidirectional Encoder Representations from Transformers (BERT) model. For example, as shown in FIG. 3, the BERT model is a pre-training model, and input data of the BERT model includes two parts: One part is a token sequence, representing an input character (or word or letter or other ways of segmenting the text of an event description), and the other part is a token position, representing a position of the input character. In the description herein, a character is used as an example of a segment of the text of an event description, which does not limit the scope of the specification. When the text classification model with the above structure is applied to the above scenario, the above text classification model cannot well distinguish which event initiator (or which event initiator provides a certain character) each character belongs to. For example, for some token sequences, a character at the 20th token position belongs to event initiator A, and for some token sequences, a character at the 20th token position belongs to event initiator B. Although a separator [SEP] is set between token sequences corresponding to different event initiators, when a data volume is small, the above text classification model still cannot well determine, through learning, which event initiator different text content included in the token sequence belongs to. Based on this, the structure of the above text classification model can be improved, and details are described herein.

For a certain event service, when a certain user needs to initiate an event of the event service to another user, the user can initiate the event of the event service to the another user by using a corresponding application installed in a terminal device, e.g. the event initiator can initiate a target event to the event target party. In addition, not only one event initiator initiates the target event to the above event target party, and a plurality of different event initiator can further initiate the target event to the above event target party. In this case, for a same event service, a plurality of different event initiators can initiate a target event to a same event target party. When initiating the target event to the event target party, each event initiator can describe a purpose or content of initiating the target event. Therefore, when initiating the target event to the event target party, each event initiator can provide event description information for initiating the target event. When it is required to detect whether the event description information provided by the plurality of event initiators for the target event is contradictory to each other, so as to determine whether an event initiator in the plurality of event initiators provides false information, and further determine whether the target event is at risk, the event description information provided by the plurality of different event initiators can be obtained.

For example, in a scenario where an event service is a resource transfer service, when a plurality of different transfer parties initiate a transfer event to a same transferee, each transfer party can further provide event description information of the transfer event when each transfer party initiates the transfer event to the transferee. When it is required to detect whether the event description information provided by the plurality of transfer parties for the transfer event is contradictory to each other, so as to determine whether a transfer party in the plurality of transfer parties provides false information, and further determine whether the transfer event is at risk, the event description information provided by the plurality of different transfer parties can be obtained.

In step S104, a plurality of character sequences of the event description information provided by the plurality of different event initiators are converted into a token sequence, the token sequence including a plurality of sub-token sequences each corresponding to a character sequence of event description information provided by an event initiator.

In implementations, the plurality of pieces of obtained event description information can be analyzed based on a requirement of input data of the text classification model. In the implementation, the plurality of character sequences of the event description information provided by the plurality of different event initiators can be converted into the token sequence based on the requirement of the input data of the text classification model. For example, a total of three different event initiators provide event description information: "wo gei wo peng you huan qian", "mai yi fu", and "jiu peng you you dian shi" in Chinese. In this case, "wo gei wo peng you huan qian", "mai yi fu", and "jiu peng you you dian shi" can be spliced, and an obtained character sequence can be "wo gei wo peng you huan qian, mai yi fu, jiu peng you you dian shi". The above character sequence can be converted into a token sequence: [CLS] wo gei wo peng you huan qian [SEP] mai yi fu [SEP] jiu peng you you dian shi. The above token sequence includes a plurality of sub-token sequences each corresponding to a character sequence of event description information provided by an event initiator: [CLS] wo gei wo peng you huan qian, [SEP] mai yi fu, and [SEP] jiu peng you you dian shi.

In step S106, a set of a first number of token positions are set for each sub-token sequence of the plurality of sub-token sequences, and characters in each sub-token sequence of the plurality of sub-token sequences are sequentially placed at a corresponding set of the first number of token positions based on an order of each sub-token sequence.

The first number can be set based on an actual situation automatically and/or dynamically. For example, the first number can be, for example, determined based on numbers of characters included in a plurality of sub-token sequences. For example, a sub-token sequence including a greatest number of characters can be obtained, and a number of characters included in the sub-token sequence can be used as the first number, or an average value of numbers of characters included in the plurality of sub-token sequences can be calculated, and the calculated average value can be used as the first number. In addition, the first number can be set based on expert or experimental experience, for example, the first number is set at 40 or 50. This can be, for example, set based on an actual situation dynamically. This is not limited in this specification.

In implementations, the token sequence can be obtained in the above manner, including a plurality of sub-token sequences. To well distinguish which event initiator (or which sub-token sequence) each character belongs to, a token position of a fixed length can be set for each sub-token sequence. As such, each sub-token sequence can be placed at a token position of a fixed length. For example, a set of a first number of token positions can be set for each sub-token sequence. Then, characters in each sub-token sequence are sequentially placed at a corresponding set of the first number of token positions based on an order of each sub-token sequence and an order of the set of the first number of token positions. Based on the same illustrative example, if the first number is 10, token positions 0 to 9 belong to the first sub-token sequence, token positions 10 to 19 belong to the second sub-token sequence, and token positions 20 to 29 belong to the third sub-token sequence. In this case, the first sub-token sequence "[CLS] wo gei wo peng you huan qian" can be placed at token positions 0 to 9, e.g. the token character "[CLS]" is placed at token position 0, the token character "wo" is placed at token position 1, the token character "gei" is placed at token position 2, the token character "wo" is placed at token position 3, the token character "peng" is placed at token position 4, the token character "you" is placed at token position 5, the token character "huan" is placed at token position 6, and the token character "qian" is placed at token position 7. In this case, all the token characters have been placed, but there are still two remaining token positions 8 and 9, and the two remaining token positions 8 and 9 can be left open without any character. Then, in the same manner as the above manner, the second sub-token sequence "[SEP] mai yi fu" can be placed at token positions 10 to 19, e.g. the token character "[SEP]" is placed at token position 10, the token character "mai" is placed at token position 11, . . . . Similarly, the third sub-token sequence "[SEP] jiu peng you you dian shi" can be placed at token positions 20 to 29, e.g., the token character "[SEP]" is placed at token position 20, the token character "jiu" is placed at token position 21, . . . , and so on.

For an example, as shown in FIG. 4, using the same illustrative example, if the first number is 6, token positions 0 to 5 belong to the first sub-token sequence, token positions 6 to 11 belong to the second sub-token sequence, and token positions 12 to 17 belong to the third sub-token sequence. In this case, the first sub-token sequence "[CLS] wo gei wo peng you huan qian" can be placed at token positions 0 to 5, e.g. the token character "[CLS]" is placed at token position 0, the token character "wo" is placed at token position 1, the token character "gei" is placed at token position 2, the token character "wo" is placed at token position 3, the token character "peng" is placed at token position 4, and the token character "you" is placed at token position 5. Because all the token positions are occupied, the last two token characters cannot be placed. In this case, it can be determined that placement of the first sub-token sequence at the token position has been completed. Then, in the same manner as the above manner, the second sub-token sequence "[SE9a iyi yi fu" can be placed at token positions 6 to 11, e.g., the token character "[SEP]" is placed at token position 6, the token character "mai" is placed at token position 7, . . . , and so on. Similarly, the third sub-token sequence "[SEP] jiu peng you you dian shi" can be placed at token positions 12 to 17, e.g., the token character "[SEP]" is placed at token position 12, the token character "jiu" is placed at token position 13, . . . , and so on. If a number of token characters exceeds a number of token positions, the sub-token sequence can be truncated based on the number of token positions, e.g., the process manner of the above first sub-token sequence is used. In the above manner, the event description information provided by each event initiator falls within a specified position range, e.g., a start position of a sub-token sequence corresponding to the event description information provided by each event initiator is fixed. As such, for the text classification model, the event description information of each event initiator has a fixed position interval, so that it can be easier to distinguish which event initiator each character belongs to.

In step S108, it is determined, based on a corresponding sub-token sequence placed at each set of the first number of token positions, token information of an event initiator corresponding to each set of the first number of token positions, and a pre-trained text classification model, whether the target event is at risk.

The token information of the event initiator corresponding to each set of the first number of token positions can be an identifier of the event initiator, for example, A, B, C . . . or 1, 2, 3 . . . . The token information of the event initiator can be set based on the token position. For example, as shown in FIG. 4, if token positions 0 to 5 belongs to event initiator A, the token information of the event initiator of token positions 0 to 5 can be all A. If token positions 6 to 11 belong to event initiator B, the token information of the event initiator of token positions 6 to 11 can be all B. This can be for example set based on an actual situation. The text classification model can be constructed based on a plurality of different algorithms. For example, the text classification model can be constructed based on a Robustly Optimized BERT Pretraining Approach (RoBERTa) model, or the text classification model can be constructed based on a BERT model, or the text classification model can be constructed based on a convolutional neural network for text (TextCNN) model. This can be for example set based on an actual situation. This is not limited in the implementation of the present specification.

In implementations, a corresponding training sample can be obtained based on a situation of the text classification model, and model training can be performed on the text classification model based on the obtained training sample, so that the text classification model has a capability of classifying text information, so as to obtain a trained text classification model. The corresponding sub-token sequence that is placed at each set of the first number of token positions and that is obtained through the above processing can be input into the above pre-trained text classification model together with the token information of the event initiator corresponding to each set of the first number of token positions. Through processing by the text classification model, related information about whether the event description information provided by the plurality of event initiators is contradictory to each other can be output. It can be determined, based on the above related information, whether an event initiator in the plurality of event initiators provides false information. If an event initiator in the plurality of event initiators provides false information, it can be determined that the event target party is at risk, and it can be determined that the target event is at risk. If no event initiator in the plurality of event initiators provides false information, it can be determined that the target event is not at risk. It should be noted that, as shown in FIG. 5, for the above-mentioned some token positions that are not filled with the token character, the token positions that are not filled with the token character can be removed before being input into the text classification model. In practice, the token positions that are not filled in with the token character may not need to be removed. This can be for example set based on an actual situation.

The implementation of the present specification provides an event risk detection method. Event description information provided by a plurality of different event initiators when the plurality of different event initiators each initiate a target event to a same event target party in a same event service is obtained. Then, a plurality of character sequences of the event description information provided by the plurality of different event initiators are converted into a token sequence, the token sequence including a plurality of sub-token sequences each corresponding to a character sequence of event description information provided by an event initiator. A set of a first number of token positions are set for each sub-token sequence of the plurality of sub-token sequences, and characters in each sub-token sequence of the plurality of sub-token sequences are sequentially placed at a corresponding set of the first number of token positions based on an order of each sub-token sequence. Finally, it is determined, based on a corresponding sub-token sequence placed at each set of the first number of token positions, token information of an event initiator corresponding to each set of the first number of token positions, and a text classification model, whether the target event is at risk. In this case, in the above manner, the event description information provided by each event initiator falls with a specified position range (a start position of a sub-token sequence corresponding to the event description information provided by each event initiator is fixed). As such, for the text classification model, the event description information of each event initiator has a fixed position interval, so that it can be easier to distinguish which event initiator each character belongs to, thereby quickly and accurately detecting whether event description information provided by a plurality of event initiators for a specified event is contradictory to each other, so as to determine whether an event initiator in the plurality of event initiators provides false information, and further determine whether the event is at risk.

As shown in FIG. 6, the implementation of the present specification provides an event risk detection method. The method can be performed by a terminal device or a server. The terminal device can be a terminal device such as a mobile phone or a tablet computer, or can be a computer device such as a notebook computer or a desktop computer, or can be an IoT device (is for example, for example, a smart watch or an in-vehicle device). The server can be an independent server, or can be a server cluster including a plurality of servers, or the like. The server can be a background server of a logistics service, a financial service, an online shopping service, or the like, or can be a background server of a certain application. In the implementation, the server is used as an example for detailed description. For an execution process of the terminal device, references can be made to the following related content. Details are omitted herein for simplicity. The method can for example include the following steps:

In step S602, historical event description information of a historical event in a plurality of different event services is obtained, where the historical event description information is information provided by a plurality of different historical event initiators when the plurality of different historical event initiators each initiate the historical event to a same historical event target party in an event service of the plurality of different event services.

In step S604, a plurality of character sequences of the historical event description information provided by the plurality of different historical event initiators is converted into a token sequence sample, where the token sequence sample includes a plurality of sub-token sequence samples each corresponding to a character sequence of historical event description information provided by a historical event initiator.

In step S606, a set of a first number of token positions are set for each sub-token sequence sample of the plurality of sub-token sequence samples, and characters in each sub-token sequence sample of the plurality of sub-token sequence samples are sequentially placed at a corresponding set of the first number of token positions based on an order of each sub-token sequence sample.

For a specific processing procedure of step S602 to step S606, references can be made to related content in the above Implementation 1. Details are omitted herein for simplicity.

In step S608, model training is performed on the text classification model based on a corresponding sub-token sequence sample placed at each set of the first number of token positions and token information of a historical event initiator corresponding to each set of the first number of token positions, to obtain a trained text classification model.

The text classification model can be constructed based on a RoBERTa model, a BERT model, a TextCNN model, or the like.

In implementations, for example, the text classification model is constructed based on the BERT model. The BERT model is an encoder based on Transformers, and a main model structure is a stack of Transformers. In the BERT model, a corresponding number of hidden vectors are obtained by using the Transformer encoder at each Transformer layer, and are transferred to a next Transformer layer. In this case, the vector is transferred downward layer by layer until a final output result is obtained. A model structure of the BERT model used to classify text information can be selected, and the BERT model can be constructed by using a corresponding algorithm. The above BERT model can be trained by using the corresponding sub-token sequence sample placed at each set of the first number of token positions and the token information of the historical event initiator corresponding to each set of the first number of token positions, to obtain a trained BERT model. Finally, the text classification model can be obtained.

In step S610, event description information provided by a plurality of different event initiators when the plurality of different event initiators each initiate a target event to a same event target party in a same event service is obtained.

In step S612, a plurality of character sequences of the event description information provided by the plurality of different event initiators are converted into a token sequence, the token sequence including a plurality of sub-token sequences each corresponding to a character sequence of event description information provided by an event initiator.

In step S614, a set of a first number of token positions are set for each sub-token sequence of the plurality of sub-token sequences, and characters in each sub-token sequence of the plurality of sub-token sequences are sequentially placed at a corresponding set of the first number of token positions based on an order of each sub-token sequence.

For a specific processing procedure of step S610 to step S614, references can be made to related content in the above Implementation 1. Details are omitted herein for simplicity.

In practice, in the above Implementation 1, there can be various specific processing manners for determining, based on a corresponding sub-token sequence placed at each set of the first number of token positions, token information of an event initiator corresponding to each set of the first number of token positions, and a pre-trained text classification model, whether the target event is at risk. The following provides an optional processing manner that can for example include the following content: inputting, into the pre-trained text classification model, the corresponding sub-token sequence placed at each set of the first number of token positions and the token information of the event initiator corresponding to each set of the first number of token positions, to obtain a corresponding output result, and determining, based on the output result, whether the target event is at risk.

In addition, when the text classification model is constructed based on the BERT model, a specific processing manner of determining, based on a corresponding sub-token sequence placed at each set of the first number of token positions, token information of an event initiator corresponding to each set of the first number of token positions, and a pre-trained text classification model, whether the target event is at risk can be further implemented by using the following step S616 and step S618.

In step S616, the corresponding sub-token sequence placed at each set of the first number of token positions and the token information of the event initiator corresponding to each set of the first number of token positions are input into the pre-trained text classification model, to obtain a corresponding output result.

In step S618, an embedded feature corresponding to a first character in the event description information provided by each event initiator is extracted from the output result, the embedded feature is input into a predetermined encoder to obtain a corresponding encoding result, and it is determined, based on the encoding result, whether the target event is at risk.

The predetermined encoder can be implemented in a plurality of different manners. This can be for example set based on an actual situation. In the implementation, to reduce resources consumed for producing and selecting an encoder, the predetermined encoder can be directly constructed by using a Transformer Block.

Figure 7:
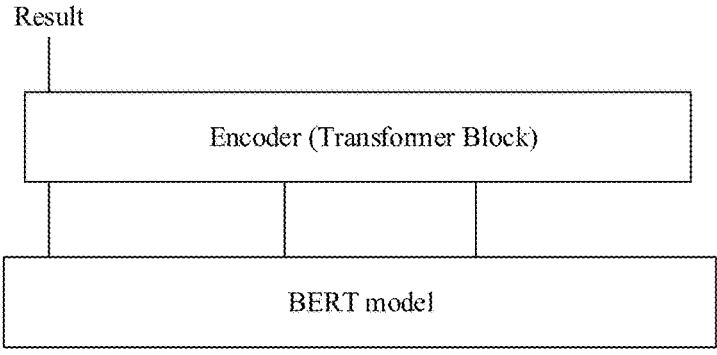
FIG. 7 is a schematic diagram illustrating another event risk detection process.

In implementations, the system architecture can be shown in FIG. 7. At an upper layer of the text classification model (e.g. the BERT model), the embedded feature corresponding to the first character (for example, "wo", "mai", and "jiu" in FIG. 7) in the event description information provided by each event initiator can be extracted from the above output result, and then the extracted embedded feature corresponding to the first character in the event description information provided by each event initiator can be processed by using two layers of Transformer Blocks (encoders). Alternatively, an embedded feature corresponding to each character in the event description information provided by each event initiator can be extracted, and then an embedded feature corresponding to a maximum value or an average value in the embedded features corresponding to the characters in the event description information provided by each event initiator is processed by using two layers of Transformer Blocks. At the second layer of Transformer Block (encoder), each input data (e.g. a corresponding encoding result obtained by inputting the above embedded feature into the predetermined encoder) basically represents the event description information provided by each event initiator, and it is easier to perform distinguishment by the text classification model. Then, it can be determined, based on the encoding result, whether the event description information provided by the plurality of event initiators is contradictory to each other, so that it can be determined whether an event initiator in the plurality of event initiators provides false information. If an event initiator in the plurality of event initiators provides false information, it can be determined that the event target party is at risk, and it can be determined that the target event is at risk. If no event initiator in the plurality of event initiators provides false information, it can be determined that the target event is not at risk.

There can be various specific processing manner for determining, based on the encoding result, whether the target event is at risk. The following provides an optional processing manner that can for example include processing of the following step A2 and step A4.

In step A2, similarities among a plurality of encoding results are determined based on a predetermined similarity algorithm.

There are a plurality of similarity algorithms such as a cosine similarity algorithm, a Euclidean distance-based similarity algorithm, and a Jaccard similarity coefficient-based similarity algorithm. This can be for example set based on an actual situation. This is not limited in the implementation of the present specification.

In implementations, a similarity between any two encoding results can be separately calculated by using the predetermined similarity algorithm, to obtain one or more different similarity values.

In step A4, if the similarities among the plurality of encoding results include a similarity less than a predetermined similarity threshold, it is determined that the target event is at risk.

The similarity threshold can be set based on an actual situation, and is for example, for example, 80% or 90%.

In addition, if the similarities among the plurality of encoding results include no similarity less than the predetermined similarity threshold, it is determined that the target event is not at risk.

To verify an effect of the above processing manner, an ablation experiment can be performed, and an experimental result is shown in the following Table 1.

TABLE 1

| System structure | Score |
| --- | --- |
| Original text classification model | 0.904 |
| Text classification model with modified content at a token position | 0.905 |
| Text classification model with modified content at a token position and an added encoder Transformer Block | 0.906 |

The result of the ablation experiment can indicate that modification to each part of the system structure has a positive effect on the final result.

The implementation of the present specification provides an event risk detection method. Event description information provided by a plurality of different event initiators when the plurality of different event initiators each initiate a target event to a same event target party in a same event service is obtained. Then, a plurality of character sequences of the event description information provided by the plurality of different event initiators are converted into a token sequence, the token sequence including a plurality of sub-token sequences each corresponding to a character sequence of event description information provided by an event initiator. A set of a first number of token positions are set for each sub-token sequence of the plurality of sub-token sequences, and characters in each sub-token sequence of the plurality of sub-token sequences are sequentially placed at a corresponding set of the first number of token positions based on an order of each sub-token sequence. Finally, it is determined, based on a corresponding sub-token sequence placed at each set of the first number of token positions, token information of an event initiator corresponding to each set of the first number of token positions, and a text classification model, whether the target event is at risk. In this case, in the above manner, the event description information provided by each event initiator falls with a specified position range (a start position of a sub-token sequence corresponding to the event description information provided by each event initiator is fixed). As such, for the text classification model, the event description information of each event initiator has a fixed position interval, so that it can be easier to distinguish which event initiator each character belongs to, thereby quickly and accurately detecting whether event description information provided by a plurality of event initiators for a specified event is contradictory to each other, so as to determine whether an event initiator in the plurality of event initiators provides false information, and further determine whether the event is at risk. In addition, at the upper layer of the text classification model, an embedded feature corresponding to the first character of each event initiator can be extracted from the output result of the text classification model, and a corresponding encoding result is obtained after being processed by using an encoder, and is used to represent the event description information provided by each event initiator, to help subsequently quickly and accurately determine whether the event description information provided by the plurality of event initiators for the specified event is contradictory to each other, so as to further improve detection efficiency and accuracy of an event risk.

Figure 8:
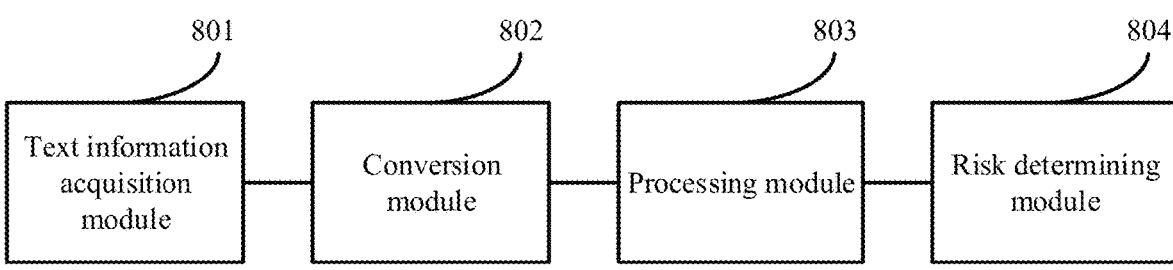
FIG. 8 illustrates an implementation of an event risk detection apparatus according to the present specification.

The event risk detection method provided in the implementation of the present specification is described above. Based on the same idea, as shown in FIG. 8, an implementation of the present specification further provides an event risk detection apparatus.

The event risk detection apparatus includes a text information acquisition module 801, a conversion module 802, a processing module 803, and a risk determining module 804.

The text information acquisition module 801 is configured to obtain event description information provided by a plurality of different event initiators when the plurality of different event initiators each initiate a target event to a same event target party in a same event service.

The conversion module 802 is configured to convert, into a token sequence, a plurality of character sequences of the event description information provided by the plurality of different event initiators, the token sequence including a plurality of sub-token sequences each corresponding to a character sequence of event description information provided by an event initiator.

The processing module 803 is configured to set a set of a first number of token positions for each sub-token sequence of the plurality of sub-token sequences, and sequentially place characters in each sub-token sequence of the plurality of sub-token sequences at a corresponding set of the first number of token positions based on an order of each sub-token sequence.

The risk determining module 804 is configured to determine, based on a corresponding sub-token sequence placed at each set of the first number of token positions, token information of an event initiator corresponding to each set of the first number of token positions, and a pre-trained text classification model, whether the target event is at risk.

In the implementation of the present specification, the risk determining module 804 inputs, into the pre-trained text classification model, the corresponding sub-token sequence placed at each set of the first number of token positions and the token information of the event initiator corresponding to each set of the first number of token positions, to obtain a corresponding output result, and determines, based on the output result, whether the target event is at risk.

In the implementation of the present specification, the risk determining module 804 includes:

a model processing unit, configured to input, into the pre-trained text classification model, the corresponding sub-token sequence placed at each set of the first number of token positions and the token information of the event initiator corresponding to each set of the first number of token positions, to obtain a corresponding output result; and a risk determining unit, configured to extract, from the output result, an embedded feature corresponding to a first character in the event description information provided by each event initiator, input the embedded feature into a predetermined encoder to obtain a corresponding encoding result, and determine, based on the encoding result, whether the target event is at risk.

In the implementation of the present specification, the risk determining unit determines similarities among plurality of encoding results based on a predetermined similarity algorithm; and if the similarities among the plurality of encoding results include a similarity less than a predetermined similarity threshold, determines that the target event is at risk.

In the implementation of the present specification, the predetermined encoder is constructed by using a Transformer Block.

In the implementation of the present specification, the apparatus further includes:

a historical text acquisition module, configured to obtain historical event description information of a historical event in a plurality of different event services, where the historical event description information is provided by a plurality of different historical event initiators when the plurality of different historical event initiators each initiate the historical event to a same historical event target party in an event service of the plurality of different event services;

a sample conversion module, configured to convert, into a token sequence sample, a plurality of character sequences of the historical event description information provided by the plurality of different historical event initiators, where the token sequence sample includes a plurality of sub-token sequence samples each corresponding to a character sequence of historical event description information provided by a historical event initiator;

a sample processing module, configured to set a set of a first number of token positions for each sub-token sequence sample of the plurality of sub-token sequence samples, and sequentially place characters in each sub-token sequence sample of the plurality of sub-token sequence samples at a corresponding set of the first number of token positions based on an order of each sub-token sequence sample; and a model training module, configured to perform model training on the text classification model based on a corresponding sub-token sequence sample placed at each set of the first number of token positions and token information of a historical event initiator corresponding to each set of the first number of token positions, to obtain a trained text classification model.

In the implementation of the present specification, the text classification model is constructed based on a BERT model.

The implementation of the present specification provides an event risk detection apparatus. Event description information provided by a plurality of different event initiators when the plurality of different event initiators each initiate a target event to a same event target party in a same event service is obtained. Then, a plurality of character sequences of the event description information provided by the plurality of different event initiators are converted into a token sequence, the token sequence including a plurality of sub-token sequences each corresponding to a character sequence of event description information provided by an event initiator. A set of a first number of token positions are set for each sub-token sequence of the plurality of sub-token sequences, and characters in each sub-token sequence of the plurality of sub-token sequences are sequentially placed at a corresponding set of the first number of token positions based on an order of each sub-token sequence. Finally, it is determined, based on a corresponding sub-token sequence placed at each set of the first number of token positions, token information of an event initiator corresponding to each set of the first number of token positions, and a text classification model, whether the target event is at risk. In this case, in the above manner, the event description information provided by each event initiator falls with a specified position range (a start position of a sub-token sequence corresponding to the event description information provided by each event initiator is fixed). As such, for the text classification model, the event description information of each event initiator has a fixed position interval, so that it can be easier to distinguish which event initiator each character belongs to, thereby quickly and accurately detecting whether event description information provided by a plurality of event initiators for a specified event is contradictory to each other, so as to determine whether an event initiator in the plurality of event initiators provides false information, and further determine whether the event is at risk. In addition, at the upper layer of the text classification model, an embedded feature corresponding to the first character of each event initiator can be extracted from the output result of the text classification model, and a corresponding encoding result is obtained after being processed by using an encoder, and is used to represent the event description information provided by each event initiator, to help subsequently quickly and accurately determine whether the event description information provided by the plurality of event initiators for the specified event is contradictory to each other, so as to further improve detection efficiency and accuracy of an event risk.

Figure 9:
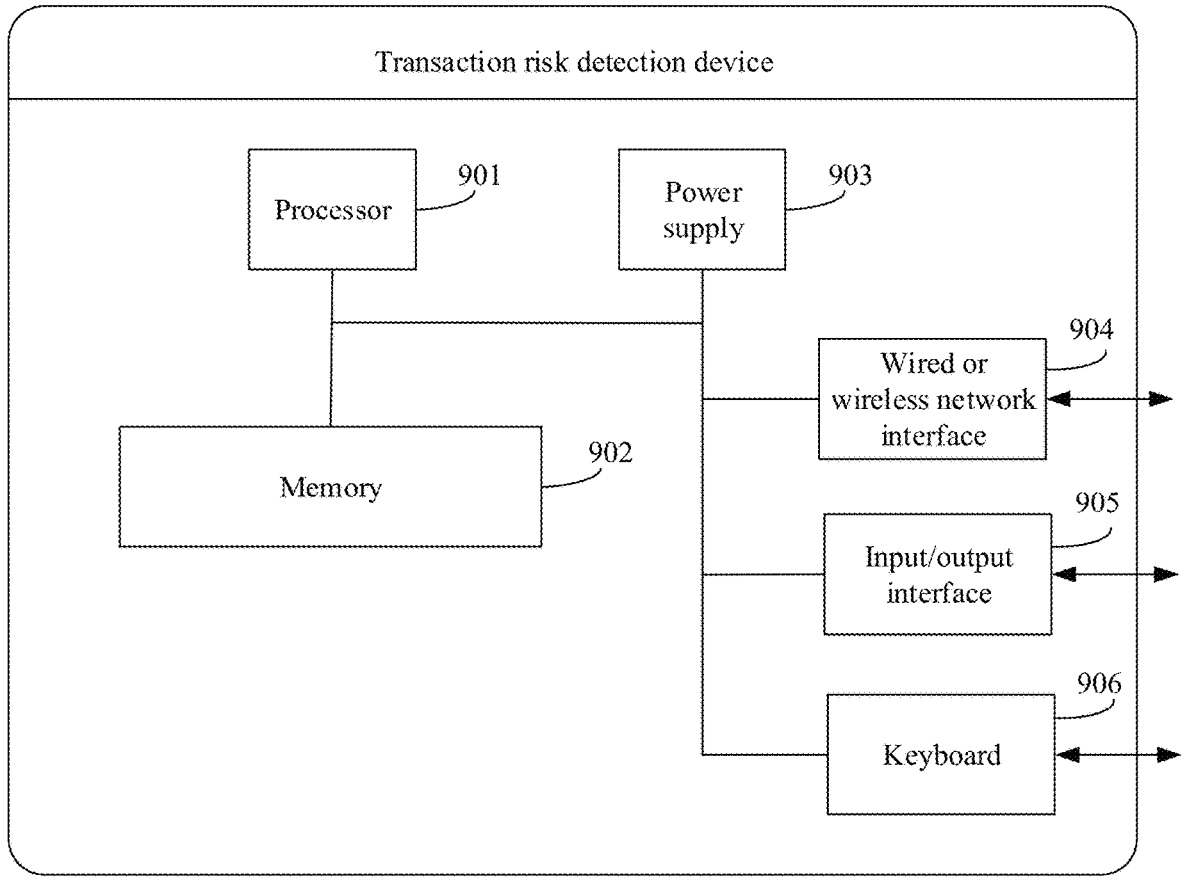
FIG. 9 illustrates an implementation of an event risk detection device according to the present specification.

The event risk detection apparatus provided in the implementation of the present specification is described above. Based on the same idea, as shown in FIG. 9, an implementation of the present specification further provides an event risk detection device.

The event risk detection device can be a terminal device, a server, or the like provided in the above implementation.

The event risk detection device can vary greatly depending on configuration or performance, and can include one or more processors 901 and a memory 902. The memory 902 can store one or more storage applications or data. The memory 902 can be a temporary storage or a persistent storage. The application stored in the memory 902 can include one or more modules (not shown in the figure), and each module can include a series of computer-executable instructions in the event risk detection device. Further, the processor 901 can be configured to communicate with the memory 902, and execute the series of computer-executable instructions in the memory 902 on the event risk detection device. The event risk detection device can further include one or more power supplies 903, one or more wired or wireless network interfaces 904, one or more input/output interfaces 905, and one or more keyboards 906.

For example, in the implementation, the event risk detection device includes a memory and one or more programs. The one or more programs are stored in the memory, the one or more programs can include one or more modules, each module can include a series of computer-executable instructions in the event risk detection device, and the one or more processors are configured to execute the following computer-executable instructions included in the one or more programs:

obtaining event description information provided by a plurality of different event initiators when the plurality of different event initiators each initiate a target event to a same event target party in a same event service;

converting, into a token sequence, a plurality of character sequences of the event description information provided by the plurality of different event initiators, the token sequence including a plurality of sub-token sequences each corresponding to a character sequence of event description information provided by an event initiator;

setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and determining, based on a corresponding sub-token sequence placed at each set of the first number of token positions, token information of an event initiator corresponding to each set of the first number of token positions, and a pre-trained text classification model, whether the target event is at risk.

In the implementation of the present specification, the determining, based on the corresponding sub-token sequence placed at each set of the first number of token positions, the token information of the event initiator corresponding to each set of the first number of token positions, and the pre-trained text classification model, whether the target event is at risk includes:

inputting, into the pre-trained text classification model, the corresponding sub-token sequence placed at each set of the first number of token positions and the token information of the event initiator corresponding to each set of the first number of token positions, to obtain a corresponding output result, and determining, based on the output result, whether the target event is at risk.

In the implementation of the present specification, the determining, based on the corresponding sub-token sequence placed at each set of the first number of token positions, the token information of the event initiator corresponding to each set of the first number of token positions, and the pre-trained text classification model, whether the target event is at risk includes:

inputting, into the pre-trained text classification model, the corresponding sub-token sequence placed at each set of the first number of token positions and the token information of the event initiator corresponding to each set of the first number of token positions, to obtain a corresponding output result; and extracting, from the output result, an embedded feature corresponding to a first character in the event description information provided by each event initiator, inputting the embedded feature into a predetermined encoder to obtain a corresponding encoding result, and determining, based on the encoding result, whether the target event is at risk.

In the implementation of the present specification, the determining, based on the encoding result, whether the target event is at risk includes:

determining similarities among a plurality of encoding results based on a predetermined similarity algorithm; and if the similarities among the plurality of encoding results include a similarity less than a predetermined similarity threshold, determining that the target event is at risk.

In the implementation of the present specification, the predetermined encoder is constructed by using a Transformer Block.

In the implementation of the present specification, the following is further included:

obtaining historical event description information of a historical event in a plurality of different event services, where the historical event description information is provided by a plurality of different historical event initiators when the plurality of different historical event initiators each initiate the historical event to a same historical event target party in an event service of the plurality of different event services;

converting, into a token sequence sample, a plurality of character sequences of the historical event description information provided by the plurality of different historical event initiators, where the token sequence sample includes a plurality of sub-token sequence samples each corresponding to a character sequence of historical event description information provided by a historical event initiator;

setting a set of a first number of token positions for each sub-token sequence sample of the plurality of sub-token sequence samples, and sequentially placing characters in each sub-token sequence sample of the plurality of sub-token sequence samples at a corresponding set of the first number of token positions based on an order of each sub-token sequence sample; and performing model training on the text classification model based on a corresponding sub-token sequence sample placed at each set of the first number of token positions and token information of a historical event initiator corresponding to each set of the first number of token positions, to obtain a trained text classification model.

In the implementation of the present specification, the text classification model is constructed based on a BERT model.

The implementation of the present specification provides an event risk detection device. Event description information provided by a plurality of different event initiators when the plurality of different event initiators each initiate a target event to a same event target party in a same event service is obtained. Then, a plurality of character sequences of the event description information provided by the plurality of different event initiators are converted into a token sequence, the token sequence including a plurality of sub-token sequences each corresponding to a character sequence of event description information provided by an event initiator. A set of a first number of token positions are set for each sub-token sequence of the plurality of sub-token sequences, and characters in each sub-token sequence of the plurality of sub-token sequences are sequentially placed at a corresponding set of the first number of token positions based on an order of each sub-token sequence. Finally, it is determined, based on a corresponding sub-token sequence placed at each set of the first number of token positions, token information of an event initiator corresponding to each set of the first number of token positions, and a text classification model, whether the target event is at risk. In this case, in the above manner, the event description information provided by each event initiator falls with a specified position range (a start position of a sub-token sequence corresponding to the event description information provided by each event initiator is fixed). As such, for the text classification model, the event description information of each event initiator has a fixed position interval, so that it can be easier to distinguish which event initiator each character belongs to, thereby quickly and accurately detecting whether event description information provided by a plurality of event initiators for a specified event is contradictory to each other, so as to determine whether an event initiator in the plurality of event initiators provides false information, and further determine whether the event is at risk. In addition, at the upper layer of the text classification model, an embedded feature corresponding to the first character of each event initiator can be extracted from the output result of the text classification model, and a corresponding encoding result is obtained after being processed by using an encoder, and is used to represent the event description information provided by each event initiator, to help subsequently quickly and accurately determine whether the event description information provided by the plurality of event initiators for the specified event is contradictory to each other, so as to further improve detection efficiency and accuracy of an event risk.

Further, based on the above methods shown in FIG. 1 to FIG. 7, one or more implementations of the present specification further provide a storage medium, configured to store computer-executable instruction information. In a specific implementation, the storage medium can be a USB flash drive, an optical disc, a hard disk, or the like. When the computer-executable instruction information stored in the storage medium is executed by a processor, the following process can be implemented:

obtaining event description information provided by a plurality of different event initiators when the plurality of different event initiators each initiate a target event to a same event target party in a same event service;

converting, into a token sequence, a plurality of character sequences of the event description information provided by the plurality of different event initiators, the token sequence including a plurality of sub-token sequences each corresponding to a character sequence of event description information provided by an event initiator;

setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and determining, based on a corresponding sub-token sequence placed at each set of the first number of token positions, token information of an event initiator corresponding to each set of the first number of token positions, and a pre-trained text classification model, whether the target event is at risk.

In the implementation of the present specification, the determining, based on the corresponding sub-token sequence placed at each set of the first number of token positions, the token information of the event initiator corresponding to each set of the first number of token positions, and the pre-trained text classification model, whether the target event is at risk includes:

inputting, into the pre-trained text classification model, the corresponding sub-token sequence placed at each set of the first number of token positions and the token information of the event initiator corresponding to each set of the first number of token positions, to obtain a corresponding output result, and determining, based on the output result, whether the target event is at risk.

In the implementation of the present specification, the determining, based on the corresponding sub-token sequence placed at each set of the first number of token positions, the token information of the event initiator corresponding to each set of the first number of token positions, and the pre-trained text classification model, whether the target event is at risk includes:

inputting, into the pre-trained text classification model, the corresponding sub-token sequence placed at each set of the first number of token positions and the token information of the event initiator corresponding to each set of the first number of token positions, to obtain a corresponding output result; and extracting, from the output result, an embedded feature corresponding to a first character in the event description information provided by each event initiator, inputting the embedded feature into a predetermined encoder to obtain a corresponding encoding result, and determining, based on the encoding result, whether the target event is at risk.

In the implementation of the present specification, the determining, based on the encoding result, whether the target event is at risk includes:

determining similarities among a plurality of encoding results based on a predetermined similarity algorithm; and if the similarities among the plurality of encoding results include a similarity less than a predetermined similarity threshold, determining that the target event is at risk.

In the implementation of the present specification, the predetermined encoder is constructed by using a Transformer Block.

In the implementation of the present specification, the following is further included:

obtaining historical event description information of a historical event in a plurality of different event services, where the historical event description information is provided by a plurality of different historical event initiators when the plurality of different historical event initiators each initiate the historical event to a same historical event target party in an event service of the plurality of different event services;

converting, into a token sequence sample, a plurality of character sequences of the historical event description information provided by the plurality of different historical event initiators, where the token sequence sample includes a plurality of sub-token sequence samples each corresponding to a character sequence of historical event description information provided by a historical event initiator;

setting a set of a first number of token positions for each sub-token sequence sample of the plurality of sub-token sequence samples, and sequentially placing characters in each sub-token sequence sample of the plurality of sub-token sequence samples at a corresponding set of the first number of token positions based on an order of each sub-token sequence sample; and performing model training on the text classification model based on a corresponding sub-token sequence sample placed at each set of the first number of token positions and token information of a historical event initiator corresponding to each set of the first number of token positions, to obtain a trained text classification model.

In the implementation of the present specification, the text classification model is constructed based on a BERT model.

The implementation of the present specification provides a storage medium. Event description information provided by a plurality of different event initiators when the plurality of different event initiators each initiate a target event to a same event target party in a same event service is obtained. Then, a plurality of character sequences of the event description information provided by the plurality of different event initiators are converted into a token sequence, the token sequence including a plurality of sub-token sequences each corresponding to a character sequence of event description information provided by an event initiator. A set of a first number of token positions are set for each sub-token sequence of the plurality of sub-token sequences, and characters in each sub-token sequence of the plurality of sub-token sequences are sequentially placed at a corresponding set of the first number of token positions based on an order of each sub-token sequence. Finally, it is determined, based on a corresponding sub-token sequence placed at each set of the first number of token positions, token information of an event initiator corresponding to each set of the first number of token positions, and a text classification model, whether the target event is at risk. In this case, in the above manner, the event description information provided by each event initiator falls with a specified position range (a start position of a sub-token sequence corresponding to the event description information provided by each event initiator is fixed). As such, for the text classification model, the event description information of each event initiator has a fixed position interval, so that it can be easier to distinguish which event initiator each character belongs to, thereby quickly and accurately detecting whether event description information provided by a plurality of event initiators for a specified event is contradictory to each other, so as to determine whether an event initiator in the plurality of event initiators provides false information, and further determine whether the event is at risk. In addition, at the upper layer of the text classification model, an embedded feature corresponding to the first character of each event initiator can be extracted from the output result of the text classification model, and a corresponding encoding result is obtained after being processed by using an encoder, and is used to represent the event description information provided by each event initiator, to help subsequently quickly and accurately determine whether the event description information provided by the plurality of event initiators for the specified event is contradictory to each other, so as to further improve detection efficiency and accuracy of an event risk.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. A digital system is "integrated" on a PLD by a designer without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. Those skilled in the art should also be clear that a hardware circuit for implementing the logic method procedure can be easily obtained by performing logic programming the method procedure by using a few hardware description languages and programming the method procedure into an integrated circuit.

A controller can be implemented in any suitable way, for example, the controller can use a form such as a micro-processor, a processor, or a computer-readable medium, a logic gate, a switch, an application specific integrated circuit (ASIC), a programmable logic controller, or an embedded micro-controller storing computer-readable program code (such as software or firmware) that can be executed by the (micro)-processor. Examples of the controller include but are not limited to the following micro-controllers: ARC 625D, Atmel AT91SAM, Microchip PIC18F26K20, and Silicone Labs C8051F320. The controller can also be implemented as a part of control logic of the memory. A person skilled in the art also knows that, in addition to implementing the controller in a pure computer-readable program code way, logic programming can absolutely be performed on method steps to enable the controller to implement the same function in a form of a logic gate, a switch, an application specific integrated circuit, a programmable logic controller, or an embedded micro-controller. Therefore, the controller can be considered as a hardware component, and an apparatus configured to implement various functions in the controller can also be considered as a structure in the hardware component. Alternatively, an apparatus configured to implement various functions can even be considered as both a software module implementing the method and a structure in the hardware component.

Systems, apparatuses, modules, or units that are described in the above implementations can be for example implemented by using a computer chip or an entity, or by using a product with a certain function. A typical implementation device is a computer. For example, for example, the computer can be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the previous apparatus is described by dividing functions into various units. Certainly, when one or more implementations of the present specification are implemented, a function of each unit can be implemented in one or more pieces of software and/or hardware.

A person skilled in the art should understand that the implementations of the present specification can be provided as methods, systems, or computer program products. Therefore, one or more implementations of the present application can use a form of hardware only implementations, software only implementations, or implementations with a combination of software and hardware. Moreover, one or more implementations of the present specification can use a form of a computer program product that is implemented on one or more computer-usable storage media (including but not limited to a disk memory, a CD-ROM, an optical memory, etc.) that include computer-usable program code.

The implementations of the present specification are described with reference to the flowcharts and/or block diagrams of the method, the device (system), and the computer program product based on the implementations of the present specification. It should be understood that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable fraud case serial-to-parallel device to generate a machine, so that the instructions executed by the computer or the processor of the another programmable fraud case serial-to-parallel device generate a device for implementing a specific function in one or more processes in the flowcharts and/or in one or more blocks in the block diagrams.

These computer program instructions can be stored in a computer-readable memory that can instruct the computer or the another programmable fraud case serial-to-parallel device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable fraud case serial-to-parallel device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes permanent and non-permanent, removable and non-removable media, and can store information by using any method or technology. The information can be a computer-readable instruction, a data structure, a program module, or other data. Examples of a computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. As described in the present specification, the computer-readable medium does not include transitory computer-readable media (transitory media) such as a modulated data signal and a carrier.

It should also be noted that the terms "include", "comprise", or their any other variants are intended to cover a non-exclusive inclusion, so a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the implementations of the present specification can be provided as methods, systems, or computer program products. Therefore, one or more implementations of the present application can use a form of hardware only implementations, software only implementations, or implementations with a combination of software and hardware. Moreover, one or more implementations of the present specification can use a form of a computer program product that is implemented on one or more computer-usable storage media (including but not limited to a disk memory, a CD-ROM, an optical memory, etc.) that include computer-usable program code.

One or more implementations of the present specification can be described in the general context of computer-executable instructions executed by a computer, for example, a program module. Generally, the program module includes a routine, a program, an object, a component, a data structure, etc. executing a specific task or implementing a specific abstract data type. One or more implementations of the present specification can alternatively be practiced in distributed computing environments in which tasks are performed by remote processing devices that are connected through a communications network. In the distributed computing environments, the program module can be located in local and remote computer storage media including storage devices.

The implementations in the present specification are described in a progressive way. For same or similar parts of the implementations, mutual references can be made to the implementations. Each implementation focuses on a difference from other implementations. Particularly, a system implementation is similar to a method implementation, and therefore is described briefly. For related parts, references can be made to related descriptions in the method implementation.

The above descriptions are merely implementations of the present specification and are not intended to limit the present application. For a person skilled in the art, the present specification can be subject to various modifications and variations. Any modifications, equivalent replacements, and improvements made within the spirit and principle of the present specification shall fall within the scope of the claims in the present specification.

What is claimed is:

1. A method, the method comprising:

obtaining event description information provided by a plurality of different event initiators, the plurality of different event initiators initiating a target event to a same event target party in a same event service, each event description information provided by an event initiator including a character sequence;

converting, into a token sequence, a plurality of character sequences of the event description information provided by the plurality of different event initiators, the token sequence including a plurality of sub-token sequences each corresponding to a character sequence of event description information provided by an event initiator;

setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and classifying the target event, based on a sub-token sequence placed at a set of the first number of token positions, token information of an event initiator corresponding to the set of the first number of token positions, and a pre-trained text classification model, wherein the classifying includes:

for each event description information, obtaining an embedded feature corresponding to a character in the event description information;

obtaining, by using two layers of an encoder, an encoding result corresponding to the event description based on the embedded feature; and classifying the target event based on comparing encoding results of the event description information provided by the plurality of different event initiators to determine whether the event description information provided by two or more of the plurality of event initiators is contradictory to one another.

2. The method according to claim 1, wherein the classifying the target event includes:

inputting, into the pre-trained text classification model, the corresponding sub-token sequence placed at each set of the first number of token positions and the token information of the event initiator corresponding to each set of the first number of token positions, to obtain a corresponding output result, and classifying, based on the output result, the target event.

3. The method according to claim 1, wherein the classifying the target event includes:

inputting, into the pre-trained text classification model, the corresponding sub-token sequence placed at each set of the first number of token positions and the token information of the event initiator corresponding to each set of the first number of token positions, to obtain a corresponding output result; and extracting, from the output result, an embedded feature corresponding to a first character in the event description information provided by each event initiator;

inputting the embedded feature into the encoder to obtain a corresponding encoding result; and classifying, based on the encoding result, the target event.

4. The method according to claim 3, wherein the classifying, based on the encoding result, the target event includes:

determining similarities among a plurality of encoding results based on a similarity algorithm; and in response to that the similarities among the plurality of encoding results include a similarity value less than a similarity threshold, classifying the target event as a risk event.

5. The method according to claim 3, wherein the encoder is constructed by using a Transformer Block.

6. The method according to claim 1, further comprising:

obtaining historical event description information of a historical event in a plurality of different event services, wherein the historical event description information is provided by a plurality of different historical event initiators, the plurality of different historical event initiators having initiated the historical event to a same historical event target party in an event service of the plurality of different event services, each historical event description information provided by a historical event initiator including a character sequence;

converting, into a token sequence sample, a plurality of character sequences of the historical event description information provided by the plurality of different historical event initiators, wherein the token sequence sample includes a plurality of sub-token sequence samples each corresponding to a character sequence of historical event description information provided by a historical event initiator;

setting a set of a second number of token positions for each sub-token sequence sample of the plurality of sub-token sequence samples, and sequentially placing characters in each sub-token sequence sample of the plurality of sub-token sequence samples at a corresponding set of the second number of token positions based on an order of each sub-token sequence sample; and performing model training on the text classification model based on a corresponding sub-token sequence sample placed at each set of the second number of token positions and token information of a historical event initiator corresponding to each set of the second number of token positions, to obtain a trained text classification model.

7. The method according to claim 1, wherein the text classification model is constructed based on a Bidirectional Encoder Representations from Transformers (BERT) model.

8. A computing system, comprising:

one or more processors; and one or more storage devices, the one or more storage devices storing computer-executable instructions, the executable instructions when executed by the one or more processors, causing the one or more processors to, individually or collectively, perform operations including:

obtaining event description information provided by a plurality of different event initiators, the plurality of different event initiators initiating a target event to a same event target party in a same event service, each event description information provided by an event initiator including a character sequence;

converting, into a token sequence, a plurality of character sequences of the event description information provided by the plurality of different event initiators, the token sequence including a plurality of sub-token sequences each corresponding to a character sequence of event description information provided by an event initiator;

setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and classifying the target event, based on a sub-token sequence placed at a set of the first number of token positions, token information of an event initiator corresponding to the set of the first number of token positions, and a pre-trained text classification model, wherein the classifying includes:

for each event description information, obtaining an embedded feature corresponding to a character in the event description information:

obtaining, by using two layers of an encoder, an encoding result corresponding to the event description based on the embedded feature; and classifying the target event based on comparing encoding results of the event description information provided by the plurality of different event initiators to determine whether the event description information provided by two or more of the plurality of event initiators is contradictory to one another.

9. The computing system according to claim 8, wherein the classifying the target event includes:

inputting, into the pre-trained text classification model, the corresponding sub-token sequence placed at each set of the first number of token positions and the token information of the event initiator corresponding to each set of the first number of token positions, to obtain a corresponding output result, and classifying, based on the output result, the target event.

10. The computing system according to claim 8, wherein the classifying the target event includes:

inputting, into the pre-trained text classification model, the corresponding sub-token sequence placed at each set of the first number of token positions and the token information of the event initiator corresponding to each set of the first number of token positions, to obtain a corresponding output result; and extracting, from the output result, an embedded feature corresponding to a first character in the event description information provided by each event initiator;

inputting the embedded feature into the encoder to obtain a corresponding encoding result; and classifying, based on the encoding result, the target event.

11. The computing system according to claim 10, wherein the classifying, based on the encoding result, the target event includes:

determining similarities among a plurality of encoding results based on a similarity algorithm; and in response to that the similarities among the plurality of encoding results include a similarity value less than a similarity threshold, classifying the target event as a risk event.

12. The computing system according to claim 10, wherein the encoder is constructed by using a Transformer Block.

13. The computing system according to claim 8, wherein the operations further include:

obtaining historical event description information of a historical event in a plurality of different event services, wherein the historical event description information is provided by a plurality of different historical event initiators, the plurality of different historical event initiators having initiated the historical event to a same historical event target party in an event service of the plurality of different event services, each historical event description information provided by a historical event initiator including a character sequence;

converting, into a token sequence sample, a plurality of character sequences of the historical event description information provided by the plurality of different historical event initiators, wherein the token sequence sample includes a plurality of sub-token sequence samples each corresponding to a character sequence of historical event description information provided by a historical event initiator;

setting a set of a second number of token positions for each sub-token sequence sample of the plurality of sub-token sequence samples, and sequentially placing characters in each sub-token sequence sample of the plurality of sub-token sequence samples at a corresponding set of the second number of token positions based on an order of each sub-token sequence sample; and performing model training on the text classification model based on a corresponding sub-token sequence sample placed at each set of the second number of token positions and token information of a historical event initiator corresponding to each set of the second number of token positions, to obtain a trained text classification model.

14. The computing system according to claim 8, wherein the text classification model is constructed based on a Bidirectional Encoder Representations from Transformers (BERT) model.

15. A non-transitory storage medium, the storage medium having computer-executable instructions stored thereon, the executable instructions, when executed by one or more processors, causing the one or more processors to, individually or collectively, implement acts comprising:

obtaining event description information provided by a plurality of different event initiators, the plurality of different event initiators initiating a target event to a same event target party in a same event service, each event description information provided by an event initiator including a character sequence;

converting, into a token sequence, a plurality of character sequences of the event description information provided by the plurality of different event initiators, the token sequence including a plurality of sub-token sequences each corresponding to a character sequence of event description information provided by an event initiator;

setting a set of a first number of token positions for each sub-token sequence of the plurality of sub-token sequences, and sequentially placing characters in each sub-token sequence of the plurality of sub-token sequences at a corresponding set of the first number of token positions based on an order of each sub-token sequence; and classifying the target event, based on a sub-token sequence placed at a set of the first number of token positions, token information of an event initiator corresponding to the set of the first number of token positions, and a pre-trained text classification model, wherein the classifying includes:

for each event description information, obtaining an embedded feature corresponding to a character in the event description information;

obtaining, by using two layers of an encoder, an encoding result corresponding to the event description based on the embedded feature; and classifying the target event based on comparing encoding results of the event description information provided by the plurality of different event initiators to determine whether the event description information provided by two or more of the plurality of event initiators is contradictory to one another.

16. The storage medium according to claim 15, wherein the classifying the target event includes:

inputting, into the pre-trained text classification model, the corresponding sub-token sequence placed at each set of the first number of token positions and the token information of the event initiator corresponding to each set of the first number of token positions, to obtain a corresponding output result, and classifying, based on the output result, the target event.

17. The storage medium according to claim 15, wherein the classifying the target event includes:

inputting, into the pre-trained text classification model, the corresponding sub-token sequence placed at each set of the first number of token positions and the token information of the event initiator corresponding to each set of the first number of token positions, to obtain a corresponding output result; and extracting, from the output result, an embedded feature corresponding to a first character in the event description information provided by each event initiator;

inputting the embedded feature into the encoder to obtain a corresponding encoding result; and classifying, based on the encoding result, the target event.

18. The storage medium according to claim 17, wherein the classifying, based on the encoding result, the target event includes:

determining similarities among a plurality of encoding results based on a similarity algorithm; and in response to that the similarities among the plurality of encoding results include a similarity value less than a similarity threshold, classifying the target event as a risk event.

19. The storage medium according to claim 17, wherein the encoder is constructed by using a Transformer Block.

20. The storage medium according to claim 15, wherein the acts further include:

obtaining historical event description information of a historical event in a plurality of different event services, wherein the historical event description information is provided by a plurality of different historical event initiators, the plurality of different historical event initiators having initiated the historical event to a same historical event target party in an event service of the plurality of different event services, each historical event description information provided by a historical event initiator including a character sequence;

converting, into a token sequence sample, a plurality of character sequences of the historical event description information provided by the plurality of different historical event initiators, wherein the token sequence sample includes a plurality of sub-token sequence samples each corresponding to a character sequence of historical event description information provided by a historical event initiator;

setting a set of a second number of token positions for each sub-token sequence sample of the plurality of sub-token sequence samples, and sequentially placing characters in each sub-token sequence sample of the plurality of sub-token sequence samples at a corresponding set of the second number of token positions based on an order of each sub-token sequence sample; and performing model training on the text classification model based on a corresponding sub-token sequence sample placed at each set of the second number of token positions and token information of a historical event initiator corresponding to each set of the second number of token positions, to obtain a trained text classification model.

* * * * *